May 16, 1933.  C. HAHN ET AL  1,909,825
ELECTRICAL GAS PURIFICATION
Filed July 23, 1929
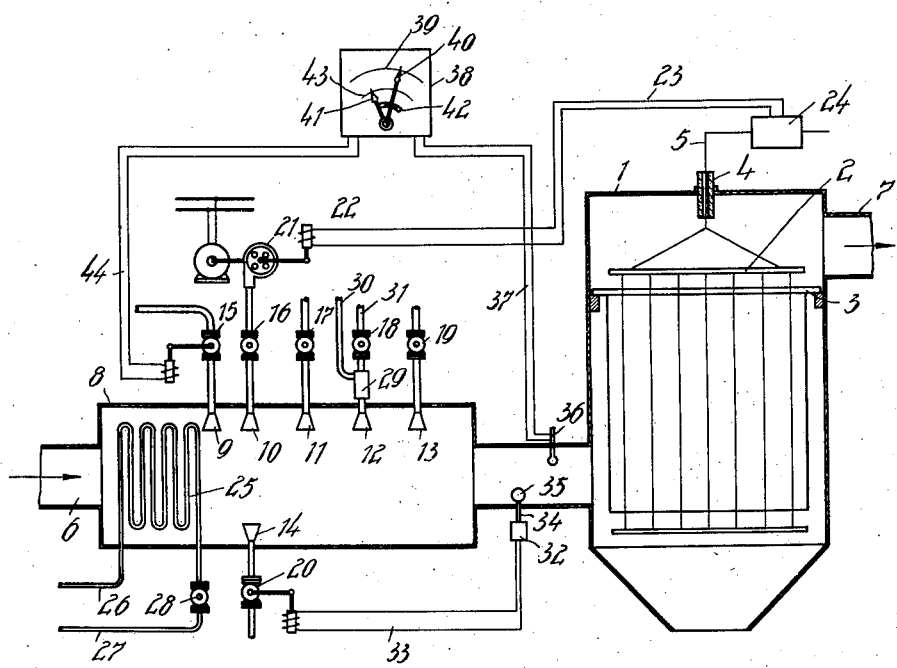
Inventors,
Carl Hahn
Carl Theodor Buff,
By Knight Bros
Attys.

Patented May 16, 1933

1,909,825

UNITED STATES PATENT OFFICE

CARL HAHN, OF BERLIN-SIEMENSSTADT, AND CARL THEODOR BUFF, OF SPANDAU NEAR BERLIN, GERMANY, ASSIGNORS, BY MESNE ASSIGNMENTS, TO INTERNATIONAL PRECIPITATION COMPANY, OF LOS ANGELES, CALIFORNIA, A CORPORATION OF CALIFORNIA

ELECTRICAL GAS PURIFICATION

Application filed July 23, 1929, Serial No. 380,298, and in Germany August 1, 1928.

Our invention relates to improvements in electrical gas purification, and more particularly in the process and equipment for the precipitation of suspended particles from blast furnace gases. It has been ascertained that the particles suspended in blast furnace gases in particular have a low or almost no conductivity at all for the electric current and thus, when precipitated in an electrical gas purification plant, form on the collecting electrodes an insulating coating which greatly reduces the precipitation effect or purifying efficiency of the precipitating chamber.

The object of our invention is to eliminate this drawback by moistening the gases to be purified in such a manner that the particles suspended in them are imparted with a conductivity suitable for the electric precipitation and that they are only thus introduced into the electrical gas purifying chamber. In this way the purifying efficiency of an electrical gas purifying chamber may be considerably increased.

The moistening or humidifying of the gases may be effected in various ways. The treatment depends substantially upon the state of the gases reaching the purifying chamber.

The drawing illustrates diagrammatically a preferred embodiment of our invention in which the gases to be purified are subjected to a preliminary treatment according to our invention.

Referring to the drawing 1 is an electrical gas purifying chamber in which are suspended the discharging or negative electrodes 2 and the collecting or positive electrodes 3. The collecting electrodes 3 are grounded while the discharging electrodes are carried by an insulator 4 through which is passed the supply lead 5 for the high-tension supply. The gases to be purified are supplied to the gas purifying chamber through the conduit 6. The purified gases escape from the chamber through the pipe 7. Into the supply conduit 6 is inserted a receptacle 8 which contains the humidifying devices 9, 10, 11, 12, 13, 14 in the form of nozzles. These nozzles may in any desired manner be controlled by the respective valves 15, 16, 17, 18, 19, 20. Through the nozzles 9 and 13 a liquid, such as water, through the nozzle 10 air, through the nozzle 11 superheated steam, through the nozzle 12 a mixture of steam and water and through the nozzle 14 steam alone may be blown into the receptacle 8.

The various humidifying devices may be used in different combinations. If, for instance, the gases to be purified contain hot vapors, colder gases, such as air, are added to them prior to their entry into the purifying chamber, so that a fog is produced within the gases which considerably facilitates the separation of the solid particles suspended in the gases. The condensate particles produced by such a fog formation have a great tendency to become electrically charged and to then migrate to the collecting surface and settle down there. The nozzle 10 serving for the introduction of the colder gases or air may be supplied therewith in any suitable manner, for instance from a gas container, not shown here. Particularly suitable is, however, the provision of a compressor or blower which injects the cold gases through the nozzle into the stream of the gases to be purified. On the drawing this blower is marked by the reference numeral 21.

The process of treatment may be carried out in such a way that the humidification of the gases to be purified is controlled dependent upon the electric current feeding the precipitation chamber, in such a manner, that when the current increases less moisture is added to the gases prior to their entry into the precipitation chamber or electric filter and when the current drops more moisture is added. For this purpose a gas supply regulating device 22 is arranged at the blower which by an electric line 23 is connected to a device 24 which may be a relay and which controls the regulating device 22 in correspondence with the fluctuations of the feeding current for the electrical precipitating chamber traversing the line 5.

In cases in which the gases to be purified are too cold they are according to our invention first heated and only then humidified by the injection of a liquid, such as water, in such a manner that the particles suspended in them have a conductivity imparted to them which suffices for the precipitation. It has been ascertained that in such cases comparatively small quantities of water suffice to impart the necessary conductivity to the dust without any risk of the formation of sludge. The heating of the gas may in any well known manner be effected by the direct transmission of heat, for instance by means of a surface heater or by direct generation of the heat within the gas itself, for instance by means of a gas flame, in case of combustible gas by an air flame.

In the example illustrated a heating coil 25 is provided for the heating of the gases and located in the forward position of the humidifying apparatus. The heating coil 25 may be connected to any suitable source of heat by pipes 26 and 27. In the pipe 27 is provided a valve 28 by means of which the supply of the heating medium to the heating coil 25 may be regulated. The valve 28 may be controlled by a relay (not shown) which depends on the changes of a thermometer located in the gas supply pipe.

The process may according to our invention also be carried out in such a way that the injection of the liquid, such as water, a solution of salt or the like takes place in several stages in succession. In comparison with the one-stage injection the advantage is attained that the liquid is more effectively absorbed by the stream of gas and does not deposit on the wall of the gas conduit in the form of beads. In the embodiment illustrated for instance liquid may be injected into the gas current to be purified through the nozzle 9 and subsequently through the nozzle 13. The liquid injected by the nozzle 9 is then already absorbed by the gas before it reaches the nozzle 13. The nozzles are preferably so adjusted that they inject only as much liquid into the gas as the latter is able to absorb without condensation taking place.

In some cases it is of advantage to admix super-heated steam with the gases prior to their entrance into the electric gas purifying chamber. This is particularly favorable for gases which are delivered in such a cold state to the purifying system, that they would easily be cooled down to the dew point on being humidified with water or ordinary steam, so that the result would be condensation and formation of sludge. Our process avoids this disadvantage altogether, and has on the other hand the further advantage that the steam contained in the gases may again be removed by condensation after they have issued from the purifying chamber, so that in the case of fuel gases a deterioration of the original thermic value is avoided. In the embodiment illustrated in the drawing the nozzle 11 serves for the injection of superheated steam. The nozzle 11 may for this purpose be connected to any suitable generator for superheated steam. The supply may be regulated in the desired manner by the valve 17.

In cases where the gases to be purified, are very hot the humidification according to the invention may be carried out in such a manner that steam and finely atomized liquid, such as water, are simultaneously introduced into the gases. In this way a sufficient humidification of the suspended solid particles is obtained on the one hand, and on the other the formation of sludge, which would occur by the injection of the liquid alone is prevented. A uniform and ample humidification and simultaneously a cooling of the gases to be purified is thus obtained in a most convenient manner. Preferably a steam injector is utilized for this purpose by which the water and the steam are first thoroughly mixed with each other and then injected into the gases. In this way a particularly good and uniform distribution of the steam and the liquid is attained. In the embodiment illustrated in the drawing 12 is the nozzle which serves for the injection of the mixture of steam and water. Ahead of the nozzle is arranged the injector 29 to which water is supplied by a pipe 30 and steam by another pipe 31. By the valve 18 located in the steam supply pipe 31 the injection of the mixture of steam and water may be regulated in the manner desired.

It has furthermore been ascertained that in cases in which the gases, prior to their entrance into the electric high-tension field, possess a different absolute content of humidity, the precipitation of dust is irregular and the gas purifying chamber has a low purifying efficiency for this reason. In this case the gases may, prior to their entry into the electrical purifying chamber, be regulated for a constant dew point so that they possess a definite absolute content of humidity. In the event of such a preliminary treatment of the gases the efficiency of the electrical precipitation of the solid particles suspended in the gases is considerably higher.

A suitable equipment by which the gases may be treated in the manner described may preferably be so designed that in the stream of gas, or in a shunt stream tapped from the main stream there is located a contact hygrometer by which is controlled a relay by means of which a water or steam nozzle is regulated. In the embodiment illustrated in the drawing there is provided for this purpose the nozzle 14 which is connected to steam mains and is regulated by the valve 20. This valve 20 is controlled by a relay 32 with which it is connected by the line 33, and which in turn includes in its circuit the contact hygrometer 35 located in the gas supply pipe which leads to the purifying chamber. Relay 32 is thus controlled by the hygrometer in correspondence with the fluctuations in the humidity of the gases to be purified. By such an equipment the gases may automatically be so regulated that when entering or passing through a discharge field they have a definite absolute content of humidity.

With gases, the condition of which varies considerably, it has been ascertained that in spite of the adjustment of a definite humidification a good precipitating action is not always obtained. This is particularly the case if the temperature of these gases is subject to strong fluctuations. In such a case an improvement in the precipitating action may be obtained by regulating the humidification of the gases also in accordance with their temperature. If, for instance, the temperature of the gases rises, the humidification of the gases is increased and if the temperature of the gases drops the humidification is decreased.

A preferred equipment for carrying out this gas treatment consists in connecting the pointer of an instrument responsive to the prevailing gas temperature with a lever regulating the humidification. Preferably the arrangement is such that the lever regulating the humidification may be coupled in different operating positions with the pointer indicating the temperature of the gases. This renders it possible to adjust the degree of humidification, so that it increases with the rising temperature in any desired manner.

In the design of the equipment shown in the drawing a contact thermometer 36 is for this purpose located in the gas supply conduit and connected by a line 37 with the apparatus 38 upon which is provided a scale 39 on which the pointer 40 controlled by the contact thermometer 36 across the line 37 indicates the temperature of the gas at the time. On the spindle of the pointer 40 is rotatably mounted a lever 41 likewise designed as pointer and which by the connecting member 42 can be coupled to the pointer 40 at a certain angle. When this lever 41 moves across the scale 43, a valve 15 is controlled through a line 44 which valve regulates the inflow of the humidification liquid to the nozzle 9. The regulation takes place in such a manner that when the lever 41 is turned clockwise liquid in increasing quantities is injected in the gases to be purified. Since lever 41 is rigidly connected with the temperature indicator 40 as described lever 41 will be turned in the same direction when the temperature pointer 40 turns clockwise at rising temperature. The humidity is thus always regulated in accordance with the temperature of the gases to be purified.

A further improvement of the electrical gas purifying plants, in which the gases prior to their entry into the gas precipitation chamber are subjected to a preliminary treatment by humidifying them, consists in locating the humidifying devices in a common chamber with the devices serving for cooling or heating the gases. The carrying out of the various treatments of the gases at one point and the concentration of the apparatus necessary for the purpose in the same receptacle constitutes a substantial improvement over the arrangements prevailing today in so far as a considerable saving in the first cost of the plant and in space is effected thereby with the coincident reduction of the heat radiating surface whereby, particularly in cold weather the loss of heat to the outer atmosphere is reduced. Further advantages result from the simplification and cost reduction of the required pipe installation. In the example illustrated in the drawing all humidifying devices 9, 11, 12, 13, 14 and the heating coil 25 are housed in a common receptacle 8 connected in the gas supply conduit 6. As will be observed from the drawing a very favorable arrangement of the equipment for the preliminary treatment of the gases results in this way.

Various modifications and changes may be made without departing from the spirit and the scope of the invention.

We claim as our invention:

1. In an electrical gas purifying plant, more particularly for blast furnace gases, in combination, an electrical gas purifying chamber, a gas supply conduit for the gas to be purified, a gas discharge conduit for the purified gas, devices for humidifying the gas located in said supply conduit, and regulating devices for said humidifying devices and a control device connected in the electric operating circuit of said gas purifying chamber and being itself electrically connected to said regulating devices for controlling said regulating devices in dependence on the operating current fluctuations of the electrical gas purifier.

2. In an electrical gas purifying plant, more particularly for blast furnace gases, in combination, an electrical gas purifying chamber, a gas supply conduit for the gas to be purified, a gas discharge conduit for the purified gas, a nozzle located in said supply conduit, a compressor for supplying colder gas to said nozzle, and a regulating device on said compressor connected by an electric line with a device connected in the circuit of the electrical gas purifier and adapted to control said compressor in dependence on the fluctuations of the operating current supplied to said purifying chamber.

3. In an electrical gas purifying plant, more particularly for blast furnace gases, in combination, an electrical gas purifying chamber, a gas supply conduit for the gas to be purified, a gas discharge conduit for the purified gas, devices for humidifying the gas located in said supply conduit, an operating relay connected with at least one of said devices, a contact hygrometer located at a point of the gas supply conduit beyond the humidifying devices, and an electric connection between said relay and said hygrometer for actuating said relay, whereby the humidification of the gases is regulated to a constant dew point.

4. In an electrical gas purifying plant, more particularly for blast furnace gases, in combination, an electrical gas purifying chamber, a gas supply conduit for the gases to be purified, a gas discharge conduit for the purified gases, a device for humidifying the gas located in the gas supply conduit and a valve for controlling said device, a temperature responsive instrument located in the gas supply conduit, a temperature indicator electrically connected with said instrument, a variable control gear electrically connected with the valve of said humidifying device, and an adjustable coupling between said control gear and said temperature indicator.

5. Process for the electrical purification for gases, more particularly blast furnace gases, which pass at a substantially constant velocity through the electric precipitation chamber, which consists in regulating the humidification of the gases to be purified in dependence on the operating current supplied to the electric precipitation chamber, in such a manner that when the current increases less, and when the current decreases more humidity is added to gases prior to their entry into said precipitation chamber.

In testimony whereof we affix our signatures.

CARL HAHN.
CARL THEODOR BUFF.